INVENTOR.
WILLIAM H. HARRISON
BY
Nilsson, Robbins & Anderson
ATTORNEYS.

INVENTOR.
WILLIAM H. HARRISON
BY
Nilsson, Robbins & Anderson
ATTORNEYS

# United States Patent Office 3,187,280
Patented June 1, 1965

3,187,280
QUICK DISCONNECT COAXIAL LINE COUPLING WITH CAPACITIVE SERIES COUPLING AT INNER CONDUCTOR
William H. Harrison, Woodland Hills, Calif., assignor, by mesne assignments, to Emerson Electric Company, St. Louis, Mo.
Filed June 17, 1963, Ser. No. 288,249
10 Claims. (Cl. 333—97)

This invention relates generally to the coupling of microwave transmission lines and more particularly to devices for interconnecting center conductors of longitudinally joined coaxial transmission lines.

In the field of developing and manufacturing coaxial transmission lines, particularly those of larger diameter and for high power transmission with rigid metallic conductor members and utilizing gaseous dielectric media in the annular space between them, it is not practical, and often not possible, to provide an unjointed length of line which is adequately long for a given application. Accordingly it has been the practice to join a plurality of practical lengths together to form the required length.

Typically the outer tubular conductors are provided with mounting flanges and are rigidly bolted together. The inner conductors, on the other hand, as a practical matter, cannot be joined in such a rigid manner. It has been generally the practice therefor to provide an axially slidable connection, usually radially spring loaded, between the center conductors to be joined. The metal to metal spring loaded relationship assures direct electrical connection irrespective of vibration, mechanical tolerances, or differential thermal expansions.

The non-rigid, metal-to-metal contact gives rise to a number of disadvantages which become particularly manifest in modern microwave systems such as for example those utilized in deep space tracking systems or long range terrestial microwave links or other applications where extreme range and receiver sensitivity are required and the background noise level is of the utmost importance. A major portion of these disadvantages are either directly due to or the result of high frequency minute sparking which unavoidably occurs between different portions of the inter-leaved or otherwise interconnecting center conductors. Such arcing is a direct source of wide spectrum radio frequency noise and indirectly causes thermal and electrochemical deterioration which regeneratively aggravates the problem.

Oxidation effects similarly aggravate the arcing. Coatings can be applied to the metal surfaces to minimize such tarnishing or corrosion effects; however, these coatings often represent an electrical conduction compromise and may eventually be removed from the areas where needed by metal to metal abrasion due to thermal expansions and mechanical vibration. Furthermore the electrical contact, at best, depends upon metallic elasticity which can be significantly diminished by damage during assembly, by metal fatigue, or by corrosive erosion of the structural strength of the metal. Finally the metal to metal contact is subject to corrosive fusion which causes difficulty and, often, serious damage to the center conductors during disassembly.

Accordingly it is an object of the present invention to provide a coaxial line coupling structure which is not subject to these and other deficiencies and disadvantages of the prior art.

It is another object to provide coupling devices for center conductors of coaxial transmission lines which eliminate coaxial line junctions as sources of radio frequency noise and permit extreme receiver sensitivity with minimum background noise level.

It is another object to provide such a coaxial line connector which precludes metal to metal contact without introducing appreciable reflections or insertion loss to microwave energy propagating along the joined lines.

It is another object to provide such a center conductor connection which precludes radio frequency arcing and which is mechanically interchangeable with conventional spring loaded couplers and standard transmission lines.

It is another object to provide such a center conductor coupling device which is not subject to electrochemical or mechanical abrasion deterioration.

It is another object to provide a coaxial line connector which in its long run electrical characteristics is independent of oxidation effects and repeated differential thermal expansions, assembly and disassembly, and mechanical shock or vibration.

It is another object to provide such a center conductor connecting device which does not depend upon metallic elasticity or spring biasing for electrical connection.

Briefly, in accordance with the structural features of one example of the invention, these and other objects are achieved in a double ended metallic, substantially cylindrical element which is adapted to plug into the tubular, axially juxtaposed ends of a pair of coaxial line center conductors to be joined. Each end of the metallic element is inserted into the hollow end of a respective one of the center conductors.

A thin walled plastic dielectric sleeve is coaxially interposed in an annular space provided between the metallic element and the inner cylindrical wall of the tubular center conductor at each end thereof. The coupling between the center conductor and the metallic element is capacitive through the annular wall thickness of the dielectric sleeve. Structural relationships, presented in detail below, between the center conductor, the dielectric sleeve, and the metallic element inductively compensate for this capacitive reactance and substantially eliminate any dependence of the coupling characteristics upon relative thermal strains in the elements.

Still further details of these and other novel features and their principles of operation as well as additional objects and advantages of the invention will become apparent to the skilled artisan and be best understood from a consideration of the following description taken in connection with the accompanying drawings which are presented by way of illustrative example only and in which.

Referring to the figures in more detail, it is stressed that the particulars shown are by way of example and for purposes of illustrative discussion only and are presented in the cause of providing what is believed to be the most useful and readily understood description of the principles and structural concepts of the invention. Specifically the detailed showing is not to be taken as a limitation upon the scope of the invention which is defined by the appended claims forming, along with the drawings, a part of this specification.

Figure 1:
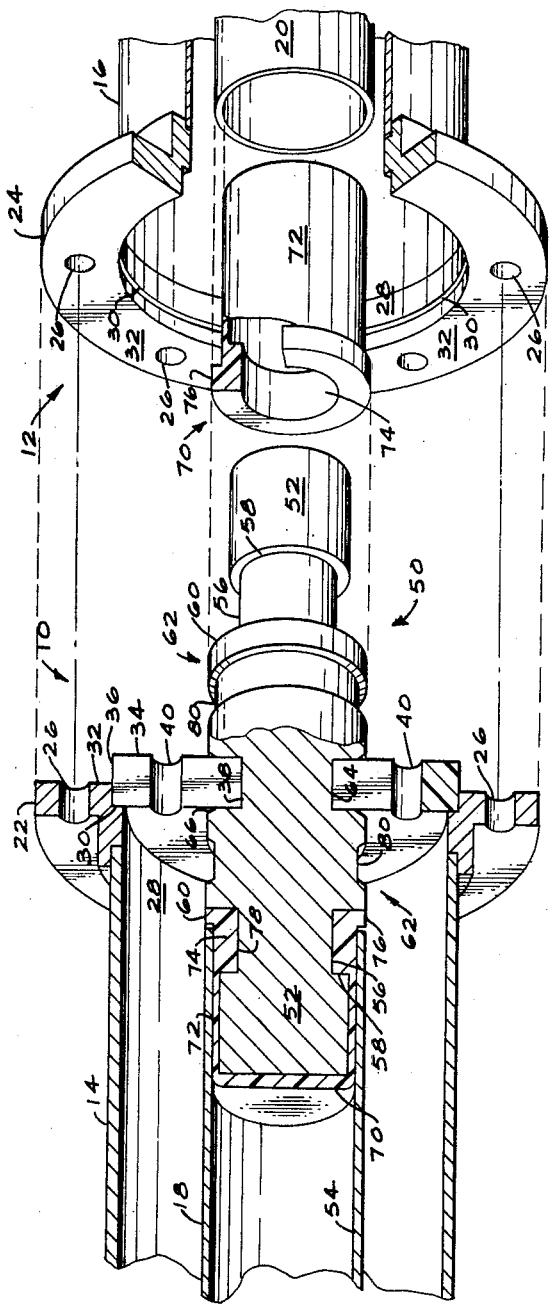
FIG. 1 is a longitudinal partially sectioned, partially exploded view of a coaxial transmission line coupling system constructed in accordance with the principles of the present invention.

In FIG. 1 the axially juxtaposed ends of a pair of coaxial transmission lines 10, 12 are illustrated as each comprising an outer tubular conductor 14, 16 respectively and an inner hollow tubular conductor 18, 20 respectively. Affixed rigidly to each of the juxtaposed ends of the outer conductors 14, 16 are mounting flanges 22, 24 which are provided with a plurality of circumferentially spaced, in-register securing apertures 26 through each of which a machine screw, not shown, may be disposed to secure compressively the juxtaposed flanges 22, 24 in face to face contact for purposes of electrical continuity of the outer conducting members as well as for rigid mechanical support to the system. Each of the flanges shown in this example has an inner cylindrical surface 28, the diameter of which is equal to the inner diameter of the outer tubular conductors 14, 16. An annular retaining shoulder 30 is formed in each of the flanges by removing a rectangular toroid from the inner cylindrical surface 28 and from the radial contacting face 32 of each of the flanges. The axial length of the toroid removed or the axial distance between the face 32 and the retaining shoulder 30 is approximately one half the axial length of a dielectric center conductor supporting disc element 34. By this means the disc element is securely retained both axially and radially between the joined ends of the outer conductors 14, 16 and their contacting mounting flanges 22, 24.

The dielectric disc element 34 is formed substantially in the shape of an annulus with an outer cylindrical surface 36 and an inner cylindrical surface 38. The annulus is typically formed with a plurality of gas passageways 40 which permit the gaseous dielectric, typically nitrogen, to flow between the various connected sections of the coaxial transmission line. With the annulus thusly formed it may be radially split from one of the gas passageways 40 to the center and thence from the center through the entire opposite annular thickness of the disc element. In this manner, the disc element being fabricated of a semi-rigid plastic material such as Teflon, the disc element may be "opened" and implaced about a reduced diameter portion of an inner conducting element as will be described subsequently.

A conductor element 50 is provided for electromagnetically and mechanically coupling the inner tubular conductors 18, 20 and is formed substantially in the shape of a figure of revolution about the axis of the coaxial transmission line system. The element is also axially symmetric about a radial plane passing transversely through its center.

For purposes of clarity and simplification the mutually symmetric portions of the element 50 in this example will be designated with like reference numerals even though they refer to a mirror image portion. Each end of the conductor element 50 has a cylindrical portion 52 having an axial length which in this example is at least as great as its diameter and having an outer diameter which is somewhat less than and annularly spaced from the inner cylindrical surface 54 of the conductor 18. Formed contiguously to the right, as viewed in the drawing, of the cylindrical body portion 52 is a first reduced diameter portion 56. The juncture between the reduced diameter portion 56 and the cylindrical body portion 52 is a radially disposed retaining shoulder 58. The opposite end of the first reduced diameter portion 56 is similarly a radial shoulder 60 which steps annularly from the reduced diameter portion 56 to a full diameter cylindrical portion 62, the diameter of which is equal to the outer diameter of the inner tubular conductor 18.

Formed in the center, axially of the conductor element 50, is a second reduced diameter portion 64, the diameter of which is selected to provide, in electromagnetic co-operation with the dielectric disc element 34, a characteristic impedance in that region of the coupling system which is substantially equal to the characteristic impedance of an unjoined length of coaxial transmission line. The axial length of the second reduced diameter portion 56 is of course approximately equal to that of the dielectric disc element 34. To aid the slip-on insertion of the disc element 34 onto the reduced diameter portion of the conductor element 50 the edges 66 of the outer shoulders of the reduced diameter portion may be chamfered as shown.

A semi-rigid plastic dielectric sleeve 70 is shown disposed over the portions 52, 56, of the left hand end of the element 50 as seen in the drawing, and is seen to include a body portion 72 which is closed at its left hand end and has an axial length approximately equal to that of the cylindrical body portion 52 of the element 50. The wall thickness of the body portion 72 is chosen to be equal to or slightly greater than the annular thickness of the spacing between the cylindrical body portion 52 of the element 50 and the inner cylindrical surface 54 of the conductor 18. The dielectric sleeve 70 also includes a base portion 74 which includes an annular flange 76 the outer diameter of which is equal to that of the conductor 18 and of the full diameter cylindrical portion 62. The full diameter portion of the flange 76 is axially thin but its inner cylindrical portion 78 extends axially for a distance equal to the axial length of the first reduced diameter portion 56 of the element 50 and is substantially longer than the relatively short axial length of the full diameter portion of the flange 76.

The substance of which the dielectric sleeve 70 is formed is preferably a semi-rigid, self-lubricating plastic such as Teflon, nylon, or Mylar and in utilization is urged over the ends of the element 50 so that its base portion 74 "pops into" the first reduced diameter portion 56 of the metallic conductor element 50. The unit is then, with the dielectric disc element 34 attached, slipped into the cylindrical space within the outer conductor; and the sleeve covered end of the element 50 is inserted within the hollow end of the inner conductor 18, or 20, as the case may be.

The length of the inner conductor is determined in a manner such that it abuts against the annular retaining shoulder formed by the annular flange 76 and the outer cylindrical surface of the body portion 72 of the dielectric sleeve 70. It is apparent that with the reduced diameter inner cylindrical portion 78 of the plastic sleeve being held against the retaining shoulder 58 the sleeve is axially firmly held in place and particularly strongly so after it is inserted within the hollow end of the inner conductor 18.

A cooperating function of the greater thickness of the inner cylindrical portion 78 of the sleeve is that it reduces the electromagnetic coupling between the element 50 and the conductor 18 in the region of the end of the latter. In this manner the relative axial position of the end of the conductor 18 is not critical. Its manufacturing tolerances are therefore greatly improved and the effects of its thermal expansions and contractions are of no significant effect regarding the coupling between the conductor and the element 50.

The major coupling between the conductor 18 and the element 50 is of course through the thin walled body portion 72 of the sleeve 70. This coupling is typically achieved in accordance with the practice of the present invention with less than .002 db of insertion loss. The coupling is however capacitively reactive and although it may be ignored in some applications it may be readily compensated for in accordance with a novel compensating feature of the invention. The compensation is achieved when desired by forming a third, reduced diameter portion 80 in the full diameter cylindrical portion 62 of the element 50 approximately midway between the first reduced diameter portion 56 and the second reduced diameter portion 64. The effect of this reduced diameter part of the portion 62 is to introduce an inductive reactance component into the total impedance of the coupling system as seen by energy propagating along the coaxial transmission line system and may be readily made to be equal and opposite to the reactance introduced by the capacitive coupling between the conductor 18 and the cylindrical body portion 52. The axial ends of the reduced diameter portion 80 may be slightly chamfered, as shown to provide a smooth transition for the matching section which it defines.

In a constructed example of a conductor element substantially identical to that illustrated in FIG. 1 for 3⅛ inch transmission line, the voltage standing wave ratio over the range of 700 to 1100 megacycles does not exceed 1.05. The insertion loss per coupling section is approximately .002 db. Similar characteristics have been obtained in other portions of the microwave spectrum by the use of straightforward scaling techniques.

Figure 2:
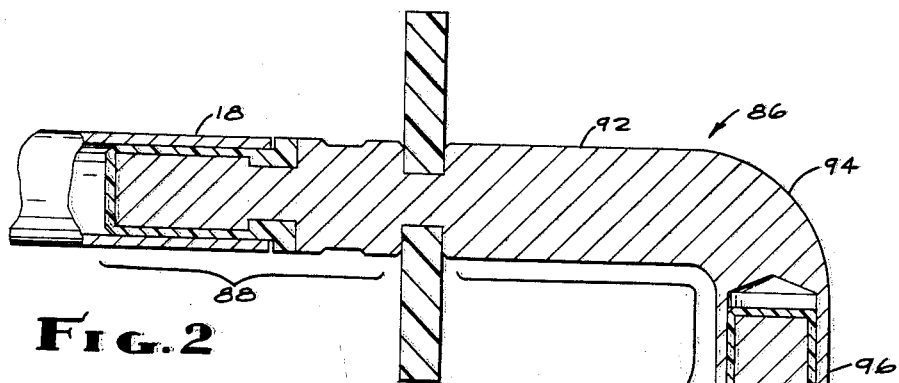
FIG. 2 is a longitudinally partially sectioned view of an alternative example of a dielectric coaxial center conductor coupler according to the invention.

Referring to FIG. 2 an example of the invention is illustrated in which, for purposes of clarity and brevity, the outer conductors of the joined transmission line sections are not shown. In this example a right angle bend, connecting element 86 is provided for joining an inner conductor 18 of one coaxial transmission line to the inner conductor 20 of another where the two are disposed at right angles to each other. The left hand end 88 of the connecting element 86 may be formed substantially identically to that of the connector element 50 of the previous figure. Its right hand end 90 however is substantially different from that of the previously described conductor element in that it includes a full diameter extension 92, its diameter being equal to the outer diameter of the conductor 18; and this extension is bent in the region 94 to form a smooth right angle transition between the axial directions of the conductors 18 and 20. The end 96 is internally bored to form a length of hollow tubing which is geometrically similar to the end of one of the conductors 18, 20. The resulting hollow tubular conductor has a length which is at least as long as the axial length of a dielectric sleeve 70 disposed over the end of a conductor element 50, which may be identical in all respects to that shown in FIG. 1.

It may be noted that the bend formed in the region 94 may be less than 90 degrees as desired. It may in fact be totally straight when needed.

Figure 3:
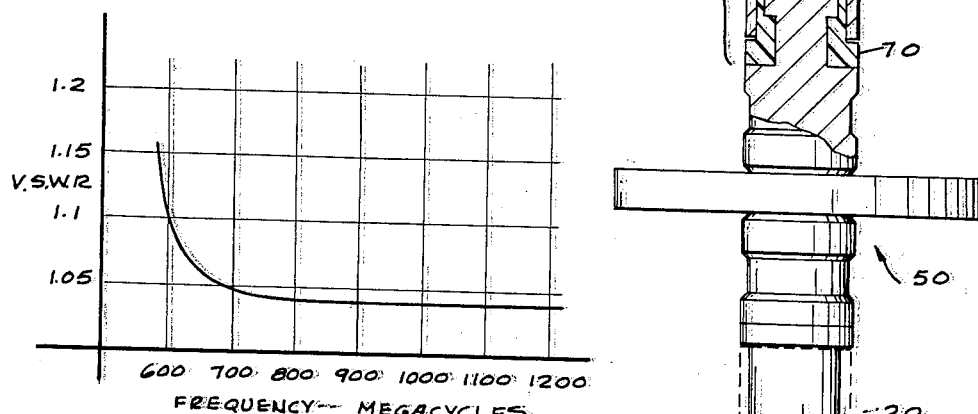
FIG. 3 is a graph illustrating one aspect of the operation of the coaxial line coupling devices of the invention.

In FIG. 3 a graph of voltage standing wave ratio as a function of frequency is presented for coaxial coupling systems constructed along the lines of those shown in the previous figures. It may be seen that throughout a wide range from below 700 megacycles the VSWR remains less than 1.05. In addition, no arcing noise whatsoever is observed in diplexing systems (simultaneous transmit-receive) even when sustained power levels of 10,000 watts are being transmitted and extreme receiver sensitivity is demanded.

Figure 4:
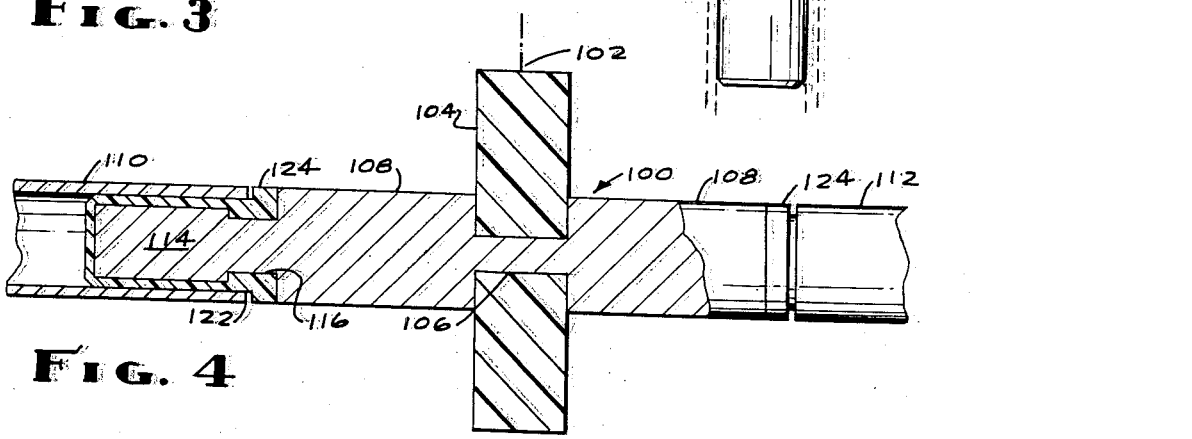
FIG. 4 is a longitudinal sectional view of an alternative example of a dielectric coaxial transmission line center conductor connector constructed in accordance with the principles of the present invention.

In FIG. 4 an example of the invention is illustrated which is useful in connection with gas barrier coaxial line coupling systems. In this figure the outer conductor has again been deleted but its existence may be assumed as desired by the reader. In this example a conductor element 100 is provided which is axially symmetric about a central radial plane indicated by the dotted line 102. A gas barrier dielectric support disc member 104 is provided which in this example may be formed of rexolite plastic which for gas barrier purposes may be axially thicker than the supporting disc element of the previous examples. Because of its higher dielectric constant, the rexolite member 104 may have a smaller inner diameter as shown, in order to achieve a substantially continuous characteristic impedance for the system. The support member 104 may be formed in place or elastically slipped over a matching reduced diameter portion 106 in the central part of the element 100. To either side of the reduced diameter portion 106 is formed a full diameter portion 108, the diameter of which is equal to the outer diameter of a pair of inner coaxial conductors 110, 112 to be joined.

Each end of the element 100 is formed to include a cylindrical body portion 114 the diameter of which is somewhat less than the inner diameter of the conductors 110, 112. Interposed between the cylindrical body portion 114 and the full diameter portion 108, there is formed a reduced diameter retaining portion 116.

A dielectric coupling sleeve 120, similar to the sleeve 70 of the previous examples, is shown disposed over the cylindrical body portion 114 and having a reduced inner diameter portion 122 which is "popped into" the reduced diameter retaining portion 116 of the element 100. The base portion of the dielectric coupling sleeve 120 also includes a full diameter flange 124 which assures axial separation between the end of the conductor 110, or 112, and the full diameter portion 108 of the element 100.

Due in part to the matching effects of the dielectric disc member 104 and the greater length of the full diameter portions 108, it has been found unnecessary to supply additional compensation for the capacitive reactance due to the coupling between the conductors 110 or 112 and the cylindrical body portions 114 of the element 100.

There have thus been disclosed a number of examples of a coaxial connector system which achieve the objects and exhibit the advantages set forth hereinabove.

What is claimed is:

1. A connector for joining axially juxtaposed ends of a pair of coaxial transmission lines each of the character having an outer metallic hollow cylindrical conductor and an inner tubular metallic conductor, the connector comprising:

a metallic conductor element having first and second ends formed substantially in the form of a figure of revolution about a predetermined axis and having:
   a cylindrical body portion disposed contiguously to said first end and having an outer diameter less by a predetermined annular thickness than the inner diameter of said tubular inner conductor;
   a first portion having a reduced diameter with respect to that of said cylindrical portion and formed contiguously thereto at its end opposite from said first end;
   a full diameter portion with at least an axial part thereof having a diameter approximately equal to that of said tubular conductor;
   a second reduced diameter portion formed contiguously to said last mentioned portion and being adapted to receive a dielectric supporting spacer disposed radially between said inner and outer conductors;
and a tubular plastic dielectric sleeve member having:
   a body portion with an inner diameter substantially equal to said outer diameter of said cylindrical portion of said conductor element and an outer diameter approximately equal to said inner diameter of said tubular inner conductor;
   a base portion formed contiguously to said body portion and having an inner diameter approximately equal to that of said first reduced diameter portion of said element and an outer diameter approximately equal to the outer diameter of said tubular inner conductor;
   and a juncture between said body and base portions forming a retaining shoulder adapted to receive the end of said tubular inner conductor and to isolate axially said inner conductor from said portion of said conductor element having a diameter approximately equal to that of said inner tubular conductor.

2. The invention according to claim 1 in which the end of said sleeve member opposite from said base portion is closed and the sleeve is disposed over that part of said metallic conductor element including said cylindrical portion and said first reduced diameter portion whereby said base portion of said sleeve member is disposed axially securely over said first reduced diameter portion.

3. The invention according to claim 1 in which said dielectric sleeve member is formed with said inner diameter of said base portion extending axially toward said body portion past said retaining shoulder.

4. The invention according to claim 1 in which said sleeve member is fabricated of self-lubricating, semi-rigid plastic, of the class including Teflon, nylon and mylar.

5. The invention according to claim 1 in which said cylindrical portion and said first reduced diameter portion of said conductor element form a junction which defines an annular retaining shoulder adapted to secure axially said base portion of said dielectric sleeve.

6. The invention according to claim 2 in which said conductor element full diameter portion is formed with a third reduced diameter portion axially intermediate the ends of the dissociated said conductor element portion whereby the added inductive reactance of said third reduced diameter portion compensates for the inserted capacitive reactance of the coupling through said body portion of said dielectric sleeve.

7. The invention according to claim 2 which includes a second dielectric sleeve member and in which said first and second ends of said conductor element are substantially symmetrical about a radial plane disposed through said second reduced diameter portion.

8. The invention according to claim 2 in which said second end of said conductor element is formed to include a cylindrical conductor extension having an outer diameter substantially equal to that of said tubular inner conductor and being effectively internally bored to form a length of hollow tubular conductor at least as long as the axial distance between said retaining shoulder and said first end of said conductor element, the inner diameter of said length of hollow tubular conductor being substantially equal to that of said tubular inner conductor whereby said internally bored length of hollow tubular conductor is geometrically similar to the connecting end portion of said tubular inner conductor of one of said coaxial transmission lines to be joined.

9. The invention according to claim 8 in which said conductor extension is formed with its cylindrical axis forming a bend in the region between said bored length and said second reduced diameter portion.

10. In a connection system for joining axially juxtaposed ends of a pair of coaxial transmission lines each of the character having an outer metallic hollow cylindrical conductor and an inner tubular metallic conductor, a metallic conductor element having first and second ends formed substantially in the form of a figure of revolution about a predetermined axis and having:
 a cylindrical body portion formed contiguously to said first end and having an outer diameter less than the inner diameter of said tubular inner conductor by a predetermined annular thickness;
 a first portion having a reduced diameter with respect to that of said cylindrical portion and formed contiguously thereto at its end opposite from said first end;
 a full diameter portion with at least an axial part thereof having a diameter approximately equal to that of said tubular conductor;

and a tubular plastic dielectric sleeve member having:
 a body portion with an inner diameter substantially equal to said outer diameter of said cylindrical portion of said conductor element and an outer diameter approximately equal to said inner diameter of said tubular inner conductor;
 a base portion formed contiguously to said body portion and having an inner diameter approximately equal to that of said first reduced diameter portion of said element and an outer diameter approximately equal to the outer diameter of said tubular inner conductor.

No references cited.

HERMAN KARL SAALBACH, *Primary Examiner.*